(12) United States Patent
Munetoh

(10) Patent No.: US 9,571,513 B2
(45) Date of Patent: Feb. 14, 2017

(54) MONITORING DEVICE MONITORING NETWORK

(71) Applicant: INTERNATIONAL BUSINESS MACHINES CORPORATION, Armonk, NY (US)

(72) Inventor: Seiji Munetoh, Kawasaki (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 50 days.

(21) Appl. No.: 14/694,361

(22) Filed: Apr. 23, 2015

(65) Prior Publication Data

US 2016/0315958 A1    Oct. 27, 2016

(51) Int. Cl.
*G06F 11/00*    (2006.01)
*H04L 29/06*    (2006.01)

(52) U.S. Cl.
CPC ....... *H04L 63/1425* (2013.01); *H04L 63/1416* (2013.01)

(58) Field of Classification Search
CPC .......................... H04L 63/1425; H04L 63/1416
See application file for complete search history.

(56) References Cited

U.S. PATENT DOCUMENTS

| | | | | |
|---|---|---|---|---|
| 5,845,069 | A | * 12/1998 | Tanaka | G06Q 20/206 705/18 |
| 2013/0096769 | A1 | 4/2013 | Kawamura et al. | |
| 2014/0250531 | A1 | 9/2014 | Moeller et al. | |
| 2014/0309853 | A1 | 10/2014 | Ricci | |
| 2014/0337976 | A1 | 11/2014 | Moeller et al. | |
| 2014/0350779 | A1 | 11/2014 | Yasue | |
| 2015/0358351 | A1* | 12/2015 | Otsuka | H04L 12/28 726/23 |

OTHER PUBLICATIONS

Huangshui, H. et al., "Online Fault Diagnosis for Controller Area Networks," Fourth International Conference on Intelligent Computation Technology and Automation, Mar. 2011. (pp. 452-455).
Muter, M. et al., "Entropy-Based Anomaly Detection for In-Vehicle Networks," IEEE Intelligent Vehicles Symposium (IV), Jun. 2011. (pp. 1110-1115).
Otsuka, S. et al., "CAN Security: Cost-Effective Intrusion Detection for Real-Time Control Systems," SAE International, Apr. 2014. (pp. 1-11).

* cited by examiner

*Primary Examiner* — Mohammed Waliullah
(74) *Attorney, Agent, or Firm* — Tutunjian & Bitetto, P.C.; Vazken Alexanian

(57) ABSTRACT

A monitoring device configured to monitor a network to which plural controllers are connected which includes a decoder configured to extract target data belonging to a target data group from data received from the plural controllers, a first comparator configured to determine whether an immutable part of the target data is known or anomalous, a second comparator configured to determine whether a reception interval of the target data group is normal or anomalous, a third comparator configured to determine whether the number of the target data having been received and included in the target data group is normal or anomalous, and determine whether each reception interval between the target data is normal or anomalous, and a warning counter configured to individually count the number of anomalies determined by the first comparator, the number of anomalies determined by the second comparator, and the number of anomalies determined by the third comparator.

8 Claims, 7 Drawing Sheets

MONITORING DEVICE MONITORING NETWORK

BACKGROUND

The present invention relates to a monitoring device, and more specifically to a monitoring device monitoring a network to which plural controllers are connected.

Various devices, including a controller, a sensor and the like, installed in a machine such as a vehicle are connected to a network, and information is exchanged between the devices. One representative example of network specifications for the above usage is a controller area network (CAN). Further, information collected in an internal network, such as the CAN, may be sent to an external server that processes the information.

SUMMARY

According to an embodiment of the present invention, a monitoring device monitoring a network to which plural controllers are connected is provided. The monitoring device includes: a decoder extracting target data belonging to a target data group from data received from the plural controllers, a first comparator determining whether an immutable part of the target data is known or anomalous, a second comparator determining whether a reception interval of the target data group is normal or anomalous; a third comparator determining whether the number of the target data having been received and included in the target data group is normal or anomalous, and determining whether each reception interval between the target data is normal or anomalous; and a warning counter individually counting the number of anomalies determined by the first comparator, the number of anomalies determined by the second comparator, and the number of anomalies determined by the third comparator.

According to another embodiment of the present invention, a semiconductor integrated circuit is provided wherein the semiconductor integrated circuit includes: a decoder, plural comparators, and a warning counter. The decoder extracts target data belonging to a target data group from data received from an outside, a first comparator of the plural comparators determines whether an immutable part of the target data is known or anomalous, a second comparator of the plural comparators determines whether a reception interval of the target data group is normal or anomalous, a third comparator of the plural comparators determines whether the number of the target data having been received and included in the target data group is normal or anomalous and each reception interval between the target data is normal or anomalous, and the warning counter individually counts the number of anomalies determined by the first comparator, the number of anomalies determined by the second comparator, and the number of anomalies determined by the third comparator.

According to yet another embodiment of the present invention, a network device is provided wherein the network device includes: plural controllers, and a monitoring device monitoring data output from each of the plural controllers. The monitoring device includes: a decoder extracting target data belonging to a target data group from data received from the plural controllers, a first comparator determining whether an immutable part of the target data is known or anomalous, a second comparator determining whether a reception interval of the target data group is normal or anomalous, a third comparator determining whether the number of the target data having been received and included in the target data group is normal or anomalous, and each reception interval between the target data is normal or anomalous, and a warning counter individually counting the number of anomalies determined by the first comparator, the number of anomalies determined by the second comparator, and the number of anomalies determined by the third comparator.

DETAILED DESCRIPTION

Hereinafter, exemplary embodiments of the present invention will be described in detail with reference to the attached drawings.

It is to be noted that the present invention is not limited to the exemplary embodiments to be given below and may be implemented with various modifications within the scope of the present invention. In addition, the drawings used herein are for purposes of illustration, and do not show actual dimensions.

First Exemplary Embodiment

Figure 1:
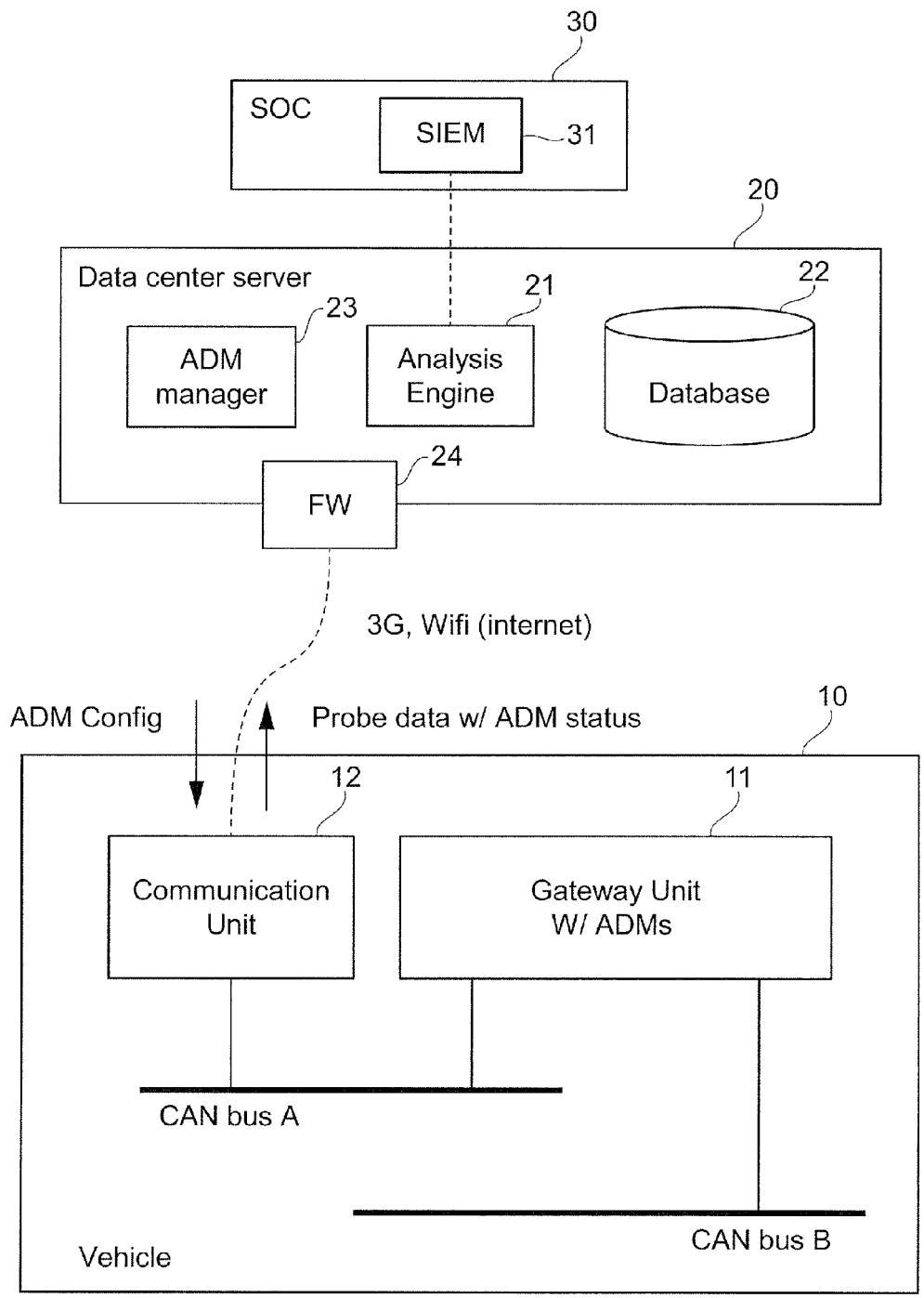
FIG. 1 is a diagram illustrating an entire configuration of an information system to which the exemplary embodiment is applied.

FIG. 1 is a diagram illustrating an entire configuration of an information system to which the exemplary embodiment is applied. In the exemplary embodiment, a system using a controller area network ("CAN") as an in-vehicle network is described as an example of a network for connecting various devices including controllers, sensors and the like installed inside a machine.

The in-vehicle network is typically composed of plural networks such as a control-system network, a body-system network, and an information-system network. To the control-system network, an engine control unit ("ECU") electronically controls vehicle-driving-system devices, such as an engine, a brake and steering, is connected, for example. To the body-system network, an ECU controls body-system devices such as meters indicating various states of the air conditioner and the vehicle, for example. To the information-system network, various information-system ECUs including a car navigation system are connected, for example.

In FIG. 1, a vehicle 10 having two CANs (e.g., CAN bus A and CAN bus B) is shown for simplifying the description. With reference to FIG. 1, the CAN bus A and the CAN bus B are connected with each other through a gateway unit 11. A communication unit 12 is connected to the CAN bus A. Although not shown in FIG. 1, various ECUs are connected to each of the CAN buses, as described above. Here, the communication unit 12 is an example of a communication device connected to an external network and sends information of a monitoring result of the monitoring device to a server on the external network. The CAN bus A and CAN bus B are an example of plural network buses to which the plural controllers are connected.

The gateway unit 11 may include anomaly detection modules ("ADM") 100 according to the exemplary embodiment. Here, the ADM 100 is an example of a monitoring device configured to monitor a network to which plural controllers are connected, and the gateway unit 11 is an example of a gateway connecting plural network buses to which the plural controllers are connected. The ADM 100 is also an example of the monitoring device that is installed in the gateway and monitors data output from the plural controllers and received through plural interfaces of the gateway for the plural network buses. The gateway unit 11 and the ADMs 100 will be described in detail below. The communication unit 12 is connected to a data center server 20 through a wireless communication line such as a mobile communication system or a wireless local area network ("LAN"). The communication unit 12 sends, to the data center server 20, probe data collected by the CANs and statistical information of the ADMs 100. The communication unit 12 sends, to the data center server 20, the probe data in which a detected event acquired by an ECU of the vehicle 10 has been embedded. The communication unit 12 receives, from the data center server 20, configuration information of the ADMs 100.

The data center server 20 may include an analysis engine 21, a database 22, and an ADM manager 23. The data center server 20 may further include a firewall ("FW") 24, and is connected to the communication unit 12 of the vehicle 10 through the wireless communication line.

The analysis engine 21 of the data center server 20 is connected to a security information and event management ("SIEM") system 31 of an external security operation center ("SOC") 30 through a communication line. The analysis engine 21 extracts the detected event from the probe data, and saves it in the database 22 to generate statistical information of individual vehicles. The analysis engine 21 performs statistical processing for detected events acquired from a number of vehicles 10 to normalize the events having differences, generates a log file of the normalization, and sends the log file to the SIEM system 31 that monitors the entire in-vehicle system. The ADM manager 23 manages all ADMs 100 in the vehicle 10 continuously and adaptively according to a key management or a detection rule.

Figure 2:
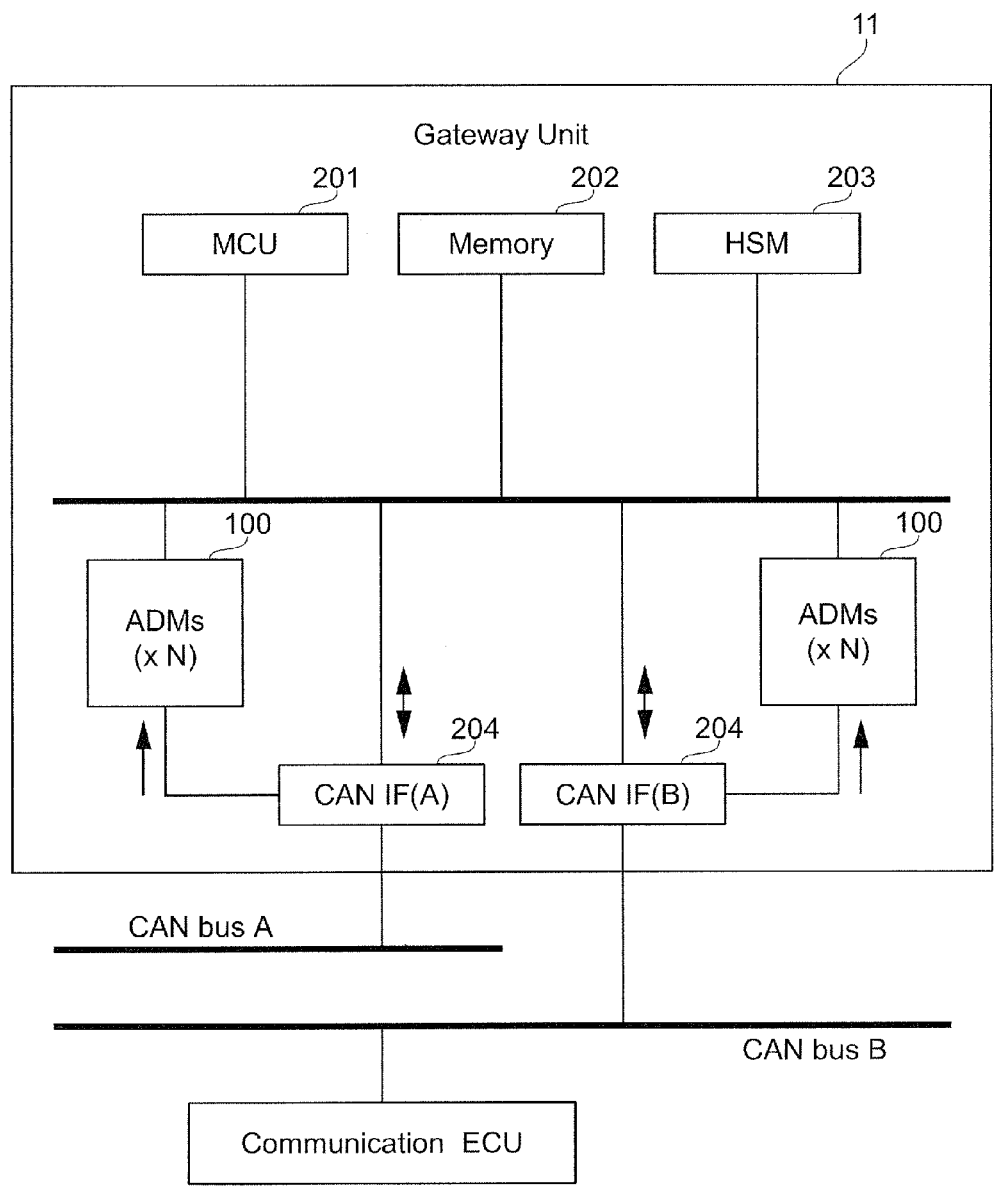
FIG. 2 is a diagram illustrating an exemplary configuration of a gateway unit.

FIG. 2 is a diagram illustrating an exemplary configuration of the gateway unit 11. As shown in FIG. 2, the gateway unit 11 may include a micro-controller unit ("MCU") 201, a memory 202, and a hardware security module ("HSM") 203. The gateway unit 11 may further include CAN interfaces ("IFs") 204 for respective CAN buses connected to the gateway unit 11. In the example illustrated in FIG. 2, the gateway unit 11 includes a CAN IF (A) 204 for the connection with the CAN bus A, and a CAN IF (B) 204 for the connection with the CAN bus B. The gateway unit 11 further includes the ADMs 100 for each of the CAN IFs 204. The ADMs 100 receive CAN messages on the connected CAN bus. Note that N represents the number of the ADMs 100 (N≥1). The number of the ADMs 100 may be a minimum number required to monitor all CAN messages after the CAN messages sorted into groups are assigned to the individual ADMs 100. Note that extra ADMs 100 may be provided for future expansion.

The MCU 201 controls behavior of the gateway unit 11, and acquires monitoring result of the ADMs 100. Specifically, the MCU 201 first configures settings for registers 103, 104, 105, 115, 116 and 117 of the ADMs 100 at the start-up of the gateway unit 11. These settings are securely managed by the HSM 203. The registers 103, 104, 105, 115, 116 and 117 will be described in detail later.

The MCU 201 periodically monitors information of a warning counter 106 (described later in detail) of each ADM 100. The MCU 201 sends the information acquired from the ADMs 100 to the data center server 20 through the communication unit 12. At this time, the MCU 201 embeds the information in the probe data and encrypts the probe data for security. After sending the information, the MCU 201 resets the warning counter 106. The reset timing depends on the capacity of the warning counter 106 and the number of the detected anomalies. If the ADM 100 detects an anomaly, the MCU 201 may stop the routing between the CAN bus A 204 and the CAN bus B 204. The memory 202 is a working memory used for various processing by the MCU 201. The HSM 203 is a processor for security functions such as encryption. The HSM 203 may perform the above functions, instead of the MCU 201.

Here, anomaly detection by the ADMs 100 according to the exemplary embodiment will be described in detail. Various ECUs are connected to the CAN bus, and various messages (e.g., CAN messages) issued by the ECUs are transmitted. In the exemplary embodiment, the ADM 100 detects anomalies of plural CAN messages of one group (e.g., CAN message group) sorted on the basis of the periodicity and collectivity of CAN message IDs ("CIDs") of the CAN messages. The ADM 100 may include timers (e.g., counters) to measure the time interval between the messages, registers to store the settings and measured results, and comparators to determine the timing, the number, and data of the CAN messages, which will be described in detail with reference to FIG. 3.

The relation between the behavior of the CAN message group and the settings for the registers 104, 105, 115, 116 and 117 of the ADM 100 in the exemplary embodiment will be described. In the exemplary embodiment, a CAN message group is defined as a group including plural CAN messages that have the same upper address and are sequentially issued. An ID decode ("IDD") and an ID mask ("IDM") define CAN message group and are set in the register 104. In the case of a special CAN message group, which includes a special CAN message that is firstly issued, the CID of the firstly-issued CAN message is set in the register 104, as a special CID ("SCID").

In the exemplary embodiment, each period (e.g., time interval) between the sequentially-issued CAN messages, included in the CAN message group, and the repeating period (e.g., time interval) of the CAN message group are identified. Then, the minimum value of the identified period ("MPmin") and the maximum value thereof ("MPmax") are set in the register 115, and the minimum value of the repeating period ("GPmin") and the maximum value thereof ("GPmax") are set in the register 117.

In the exemplary embodiment, the maximum value and the minimum value of the number of the CAN messages (sequentially-issued CAN messages) of the CAN message group are also identified. The identified maximum value ("CMCmax") and minimum value ("CMCmin") of the sequentially-issued CAN messages are set in the register 116.

In the exemplary embodiment, an immutable value (e.g., bit) ("ICM") of data of the CAN message is defined. The immutable value and the mask of the immutable value are set in the register 105. The MCU 201 sets the configuration information of the ADM 100 described above in the registers 104, 105, 115, 116 and 117 at the start-up of the gateway unit 11.

In the exemplary embodiment, the CAN messages issued by the ECUs are input to the ADMs 100, and the ADMs 100 detect anomalies such as a time interval not corresponding to a value between MPmin and MPmax or between GPmin and GPmax, the number of the CAN messages in the CAN message group not corresponding to a value between CMCmin and CMCmax, and change of the immutable bit defined by the ICM.

To ensure that all anomalies may be detected with a minimum number of the ADMs 100 to which the CAN messages are assigned, the CAN messages are sorted on the basis of the repeating period, the sequential CAN messages are consolidated into a small ID group having small distance (e.g., sequential IDs, IDs having small distance therebetween), and the distribution of the IDs and the data are controlled so that a blank is not included in the ID group (the number of the IDs is preferably $2^N$).

The registers 103 to 105 and 115 to 117 of the ADM 100 and the warning counter 106 for reporting the detection result of the ADM 100 have a fixed length. The detection result of the ADM 100 is indicated as a value of the warning counter 106 that counts individual errors. The report is sent to the data center server 20 though the communication unit 12 on a periodic basis, and the anomaly is verified after the statistical processing performed by the data center server 20. Note that the above settings and the messages may be sent after encryption.

Figure 3:
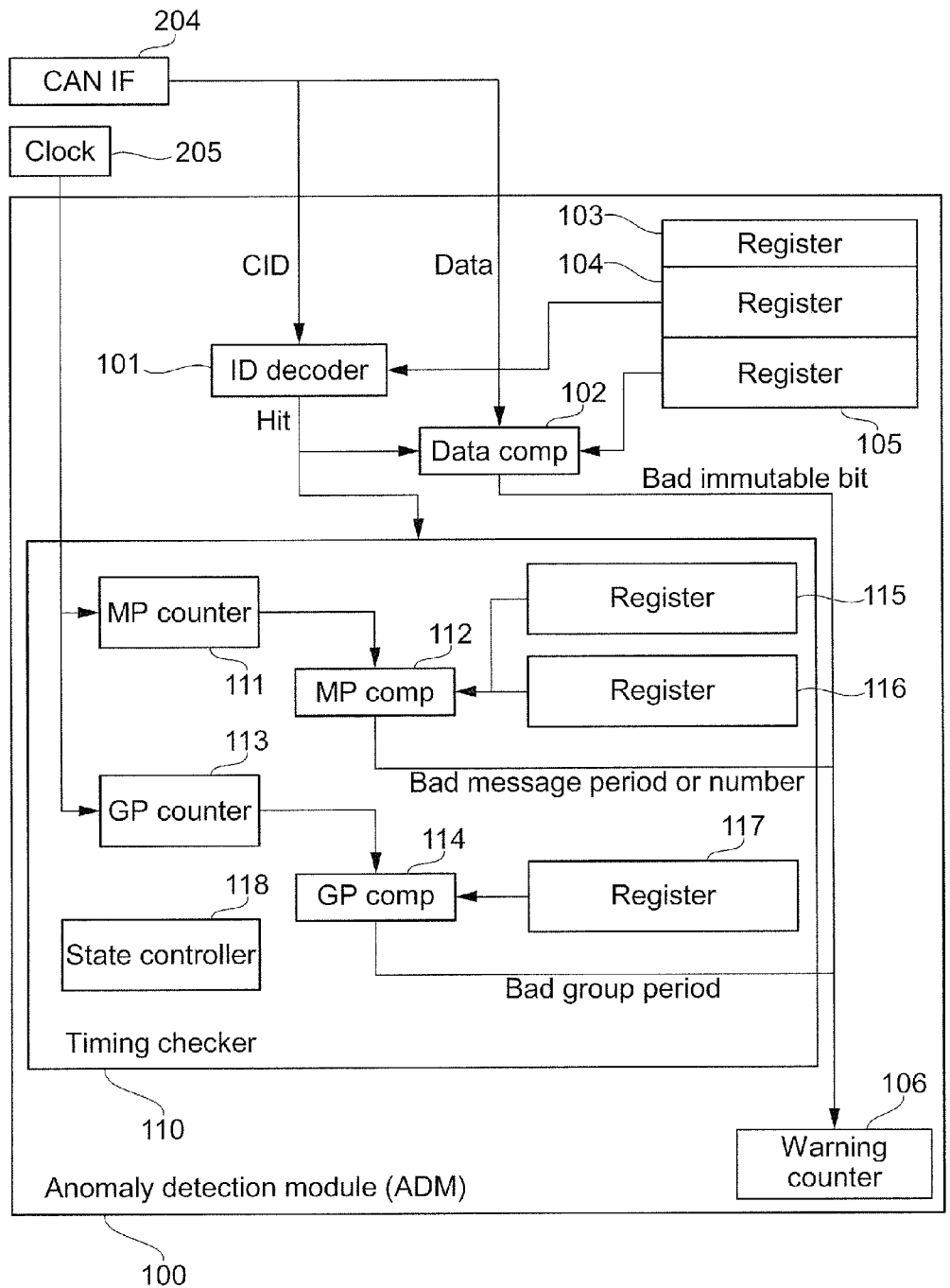
FIG. 3 is an example of a block diagram of an anomaly detection module ("ADM").

FIG. 3 is an example of a block diagram of the ADM 100. The ADM 100 may include: an ID decoder 101, a data comparator (data comp) 102, a timing checker 110, the registers 103, 104 and 105, and the warning counter 106. The ID decoder 101 receives a CAN message ID ("CID") of a CAN message from the outside through the CAN IF 204, and determines whether the CID is included in CIDs of the CAN message Group ("GIDs") assigned to the ADM 100. In addition, the ID decoder 101 determines whether the CID is a prioritized CID or not, which will be described in detail below. For the determination by the ID decoder 101, the IDD, the IDM and the SCID set in the register 104 are used. The data comparator 102 receives data of the CAN message from the outside through the CAN IF 204, also receives the CID from the ID decoder 101 if the CID is included in the GIDs, and determines whether an immutable bit of the data has not been changed. For the determination by the data comparator 102, the ICM set in the register 105 is used. Here, the ID decoder 101 is an example of a decoder configured to extract target data belonging to a target data group from data received from the plural controllers or an outside. The data comparator 102 is an example of a first comparator configured to determine whether an immutable part of the target data is known or anomalous. The register 104 is an example of a first register to which identification information of the target data is set, and the register 105 is an example of a second register to which information of the immutable part of the target data is set. The ID decoder 101 is also an example of the decoder that extracts the target data belonging to the target data group by comparing the data received from the plural controllers or the outside and a value of the identification information set in the first register, and the data comparator 102 is also an example of the first comparator that determines whether the immutable part of the target data is known or anomalous by comparing the immutable part of the target data and the value of the information set in the second register.

The timing checker 110 receives, from the ID decoder 101, information that the CID included in the GIDs has been received. In this case, the timing checker 110 measures each time interval between sequential CIDs of the sequentially-issued CAN messages of the CAN message group, the number of the sequential CIDs, and a time interval of the CAN message group. The timing checker 110 also receives, from the ID decoder 101, information that the prioritized CID has been received. In this case, the timing checker 110 stops the measurement.

Here, the detailed description of the timing checker 110 is given. The timing checker 110 may include a message period ("MP") counter 111, a message period ("MP") comparator ("MP comp") 112, a group period ("GP") counter 113, a group period ("GP") comparator ("GP comp") 114, the registers 115, 116 and 117, and a state controller 118. The MP counter 111 measures the time interval between sequential CIDs (message period). The MP comparator 112 receives the measured time interval from the MP counter 111, and determines whether the measured time interval is within the predetermined range (MPmin, MPmax) set in the register 115. The MP comparator 112 also determines whether the number of the sequential CIDs is within the predetermined range (CMCmin, CMCmax) set in the register 116. The GP counter 113 measures the time interval of the CAN message group having the sequential CIDs (group period). The GP comparator 114 determines whether the time interval of the CAN message group is within the predetermined range (GPmin, GPmax) set in the register 117. For measuring the aforementioned time intervals, the MP counter 111 and the GP counter 113 are connected to a clock 205. Note that basic configurations other than the above are set in the register 103. The state controller 118 controls the state of the timing checker 110. Here, the MP counter 111 is an example of a second counter configured to count each reception interval between the target data of the target data group, and the MP comparator 112 is an example of a third comparator configured to determine whether the number of the target data having been received and included in the target data group is normal or anomalous, and to determine whether each reception interval between the target data is normal or anomalous. The GP counter 113 is an example of a first counter configured to count the reception interval of the target data group, and the GP comparator 114 is an example of a second comparator configured to determine whether a reception interval of the target data group is normal or anomalous. The register 115 is an example of a fourth register to which a normal value of each reception interval between the target data of the target data group is set, the register 116 is an example of a fifth register to which a normal value of the number of the target data of the target data group is set, and the register 117 is an example of a third register to which a normal value of the reception interval of the target data group is set. The GP comparator 114 is also an example of the second comparator that determines whether the reception interval of the target data group is normal or anomalous by comparing a value counted by the first counter and the normal value set in the third register, and the MP comparator 112 is an example of the third comparator that determines whether each reception interval between the target data is normal or anomalous by comparing a value counted by the second counter and the normal value set in the fourth register, and determines whether the number of the target data of the target data group is normal or anomalous on the basis of the normal value set in the fifth register.

The warning counter 106 individually counts anomalies output from the data comparator 102, the MP comparator 112 and the GP comparator 114 of the timing checker 110. Specifically, the warning counter 106 adds one if the data comparator 102 determines that the immutable bit has been changed (e.g., bad immutable bit), if the MP comparator 112 determines that the time interval between the sequential CIDs (message period) or the number of the sequential CIDs is not within the predetermined range (e.g., bad message period or number), or if the GP comparator 114 determines that the time interval of the CAN message group is not within the predetermined range (e.g., bad group period). Note that, instead of the single warning counter 106 as in the exemplary embodiment, plural warning counters 106 may be provided so as to correspond to the data comparator 102, the MP comparator 112 and the GP comparator 114. Here, the warning counter 106 is an example of a warning counter configured to individually count the number of anomalies determined by the first comparator, the number of anomalies determined by the second comparator, and the number of anomalies determined by the third comparator.

Figure 4:
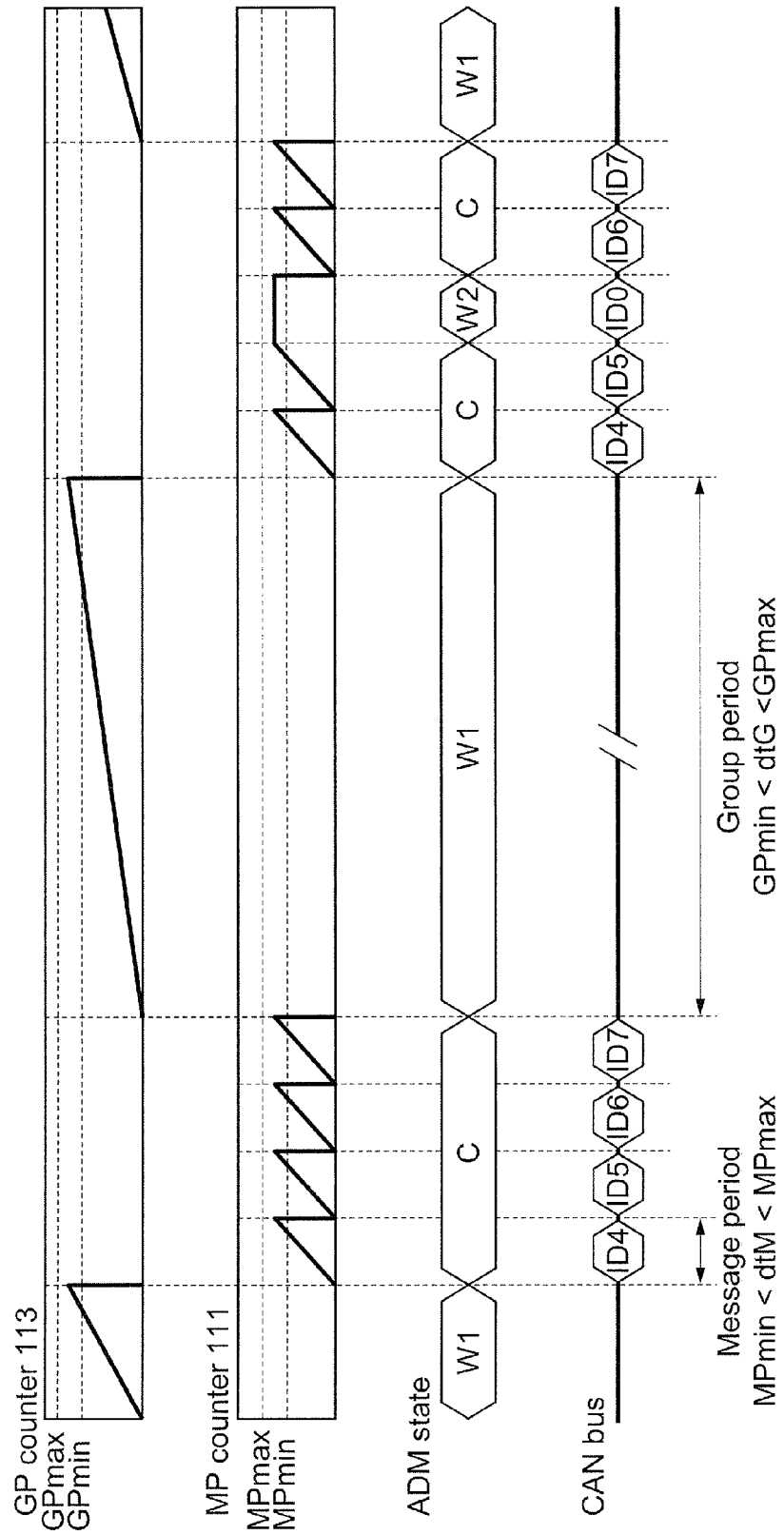
FIG. 4 is an exemplary configuration of a controller area network ("CAN") message group.

FIG. 4 is an exemplary configuration of the CAN message group. In FIG. 4, CIDs from an ID4 to an ID7 are shown, which are included in the CAN message group assigned to the ADM 100. Behavior of the MP counter 111 and the GP counter 113 responding to the CAN messages and the CAN message group is also shown in FIG. 4. In addition, the state transition of the ADM 100, which monitors the CAN message group, is shown in FIG. 4. Although the state transition of the ADM 100 will be described in detail below, the ADM 100 is in a "state C" with the input of the CAN messages, and the ADM 100 is in a "state W1" without the input of the CAN messages, as shown in FIG. 4.

As shown in FIG. 4, the CAN messages constituting the CAN message group are sequentially input to the ADM 100 at a time interval (e.g., message period) dtM. The MP counter 111 starts to count the clock numbers in response to the input of any of the CAN messages of CIDs including ID4 to IDT7 (hereinafter referred to as the CAN messages (ID4 to ID7)). Upon the next input of any of the CAN messages (ID4 to ID7), the MP counter 111 sends, to the MP comparator 112, the clock numbers (e.g., counted value) counted until the next input, and the MP counter 111 resets the counted value and starts to count the clock number. If the CAN messages (ID4 to ID7) of the CAN message group are normally input, each counted value becomes a value between the MPmin and the MP max, as shown in FIG. 4.

In FIG. 4, the counted value of the MP counter 111 is reset after the input of the last CAN message of the CAN message group (the ID7 in the example in FIG. 4), without input of the next CAN message. This is for purposes of illustration that the input of the CAN message group has been ended. In reality, the MP counter 111 stops counting the clock numbers in response to the state transition of the ADM 100 from the "state C" to the "state W1," which occurs due to the counted value of the MP counter 111 exceeding the MPmax as the next CAN message is not input after the input of the last CAN message. The state transition of the ADM 100 will be described in detail below.

As shown in FIG. 4, the CAN message group having the CAN messages (ID4 to ID7) (hereinafter referred to as the CAN message group (ID4 to ID7)) is input to the ADM 100 at a time interval (e.g., group period) dtG. The GP counter 113 starts to count the clock numbers in response to the transition of the ADM 100 from the "state C" to the "state W1." Then, the GP counter 113 sends, to the GP comparator 114, the counted clock numbers (e.g., counted value) until any one of the next CAN messages (ID4 to ID7) is input, and resets the counted value. If the CAN messages (ID4 to ID7) of the CAN message group are normally input, the counted value becomes a value between the GPmin and the GPmax, as shown in FIG. 4.

In FIG. 4, a CAN message having an ID0 is input between the CAN messages having the ID5 and the ID6 in the second input of the CAN message group (ID4 to ID7) (hereinafter, the CAN messages with the respective ID numbers are referred to as "CAN message (ID0)" and the like). This case shows that the CAN message (ID0) having higher priority than the CAN messages (ID4 to ID7) is issued at this timing. Note that the CAN message (ID0) is the CAN message monitored by another ADM 100 different from the ADM 100 monitoring the CAN messages (ID4 to ID7).

In this case, the time interval dtM between the CAN message (ID5) and the CAN message (ID6) shown in FIG. 4 may exceed the MPmax due to the interruption of the CAN message (ID0). To avoid this, in the case where the CAN message having higher priority than the CAN messages to be monitored by the ADM 100 is issued, the ADM 100 in the exemplary embodiment transitions to a "state W2" and remains in the state until the next input of any of the CAN messages (ID4 to ID7), to temporarily stop the count of the clock numbers of the MP counter 111.

As shown in FIG. 4, the MP counter 111 temporarily stops the operation at this time, and the counted value is not reset but maintained. Then, the MP counter 111 sends, to the MP comparator 112, the counted value in response to the input of the next CAN message (ID6 in FIG. 4), and resets the counted value.

Figure 5:
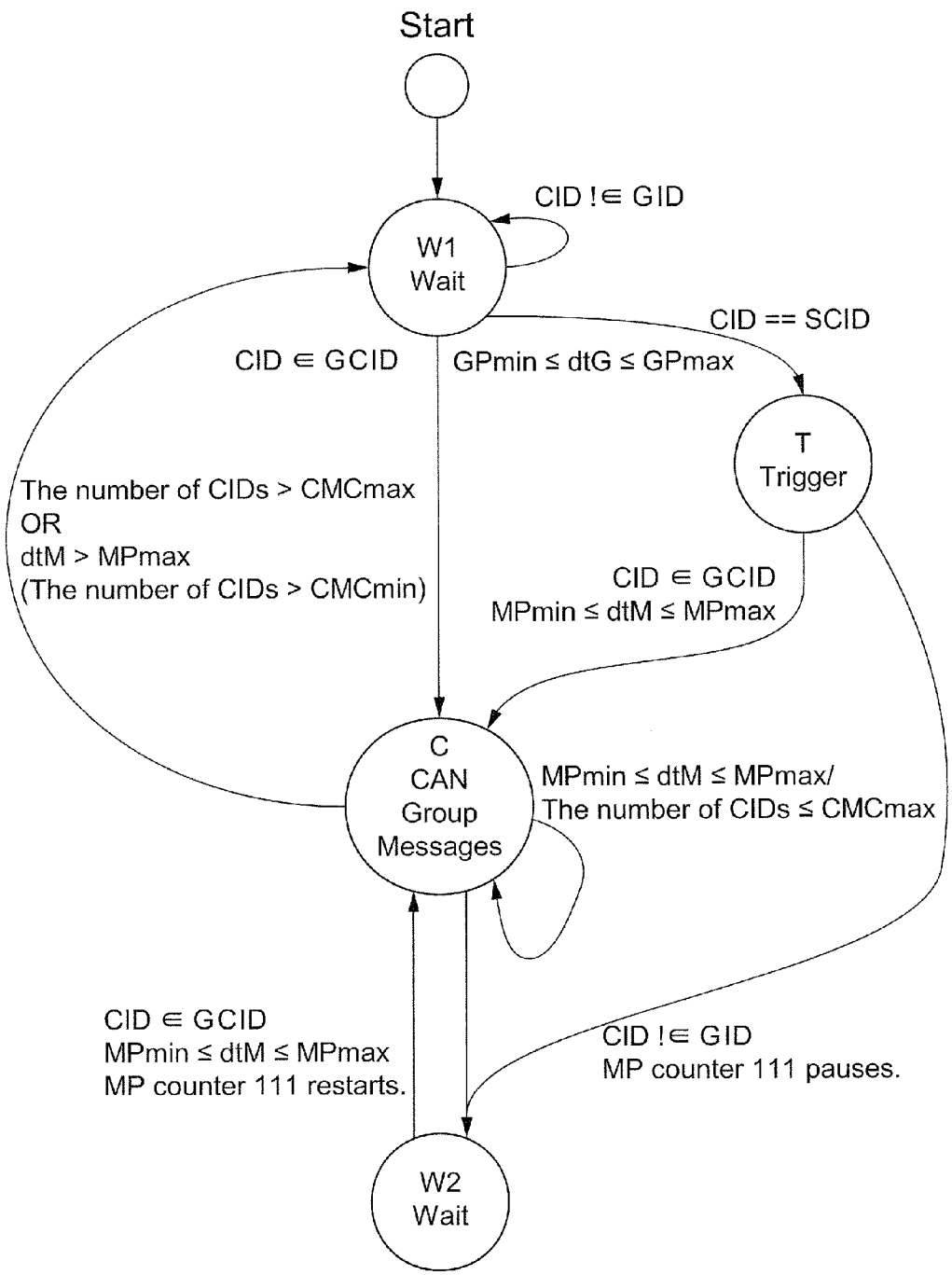
FIG. 5 is an example of a state diagram of the ADM.

Next, the behavior of the ADM 100 will be described in detail. In the exemplary embodiment, the timing checker 110 (the MP comparator 112 and the GP comparator 114) is implemented by a state machine. FIG. 5 is an example of a state diagram of the ADM 100. The ADM 100 is initially in the state W1. In the case where the ADM 100 receives a CAN message having a CID in the state W1, the ID decoder 101 determines whether the CID is included in the CIDs of the CAN message group ("GIDs") assigned to the ADM 100. If the ID decoder 101 determines that the CID is included in the GIDs, the ADM 100 transitions to the state C or a state T. In the case where the ID decoder 101 determines that the CID is not included in the GIDs, the ADM 100 remains in the state W1.

At the transition from the state W1 to the state C or the state T, the GP comparator 114 determines whether the time interval dtG of the CAN message group is within the range from GPmin to GPmax (GPmin≤dtG≤GPmax). In the case where the time interval dtG is not within the range, the GP comparator 114 reports it to the warning counter 106 as an anomaly.

In the state C of the ADM 100, the MP counter 111 counts the clock numbers (e.g., counted value) between the sequential CIDs included in the CAN message group, and the MP comparator 112 determines whether the counted value between the CIDs is within the range from the MPmin to the MPmax, and whether the number of the CAN messages is not larger than the CMCmax. In the case where the counted value is not within the range from the MPmin to the MPmax or the number of the CAN messages is larger than the CMCmax, the MP comparator 112 reports it to the warning counter 106 as an anomaly. The ADM 100 remains in the state C as long as the time interval dtM is within the range from the MPmin to the MPmax (MPmin≤dtM≤MPmax) and the number of the CAN messages does not exceed the CMCmax (≤CMCmax), except in the following case.

In the case where the ADM 100 receives a CAN message having an ID which has higher priority than the CIDs included in the GIDs in the state C, the ADM 100 transitions to the state W2. In the state W2, the MP counter 111 temporarily stops (pauses). Then, upon receiving the CAN message having the CID included in the GIDs, the ADM 100 transitions back to the state C, and the MP counter 111 restarts. Thus, the MP counter 111 measures the actual time interval and the actual number of the sequential CIDs included in the GIDs, even if the higher prioritized CAN message interrupts the sequentially-issued CAN messages assigned to the ADM 100.

Then, if the MP comparator 112 determines that the number of the CAN messages exceeds the CMCmax (>CMCmax), or the time interval dtM exceeds the MPmax (dtM>MPmax) while the number of the CAN messages is larger than the CMCmin (>CMCmin) in the state C, the ADM 100 transitions back to the state W1. At the transition to the state W1, the GP counter 113 starts to count the clock numbers. Then, the state of the ADM 100 repeatedly transitions in response to CAN messages as described above.

In addition to the above, in the case of a special CAN message group including a firstly-issued special CAN message having a special CID ("SCID"), the ADM 100 transitions from the state W1 to the state T instead of the above transition from the state W1 to the state C. That is, upon receipt of the SCID, the ADM 100 transitions from the state W1 to the state T, and the MP counter 111 starts to count clock numbers. Then, if the ADM 100 receives the CAN message having the CID included in the CIDs of the special CAN message group, the MP comparator 112 determines whether the dtM between the SCID and the CID is in the range from the MPmin to the MPmax. In the case where the dtM is within the range (MPmin≤dtM≤MPmax), the ADM 100 transitions to the state C. If the ADM 100 receives a CAN message having a CID other than the CIDs of the special CAN message group in the state T, the ADM 100 transitions to the state W2, and the MP counter 111 temporarily stops. The subsequent transition of the ADM 100 is the same as the above.

Accordingly, the ADM 100 is configured to detect anomalies on the basis of the time interval between the sequential CAN messages, the number of the sequential CAN messages and the time interval of the CAN message group while transitioning the state in response to the received CAN messages. Although not described in FIG. 5, change of the immutable bit of the CAN messages are also detected by the ADM 100 as an anomaly.

Second Exemplary Embodiment

In the first exemplary embodiment, the ADM 100 is provided in the gateway unit 11. In the second exemplary embodiment, the ADM 100 is provided in an ECU 13 connected to the CAN bus. In this case, the ADM 100 provided in the ECU 13 monitors only the CAN messages generated by the ECU 13. Here, the ADM 100 is an example of the monitoring device that is installed in each of the plural controllers, and that monitors data output from the corresponding one of the plural controllers.

Figure 6:
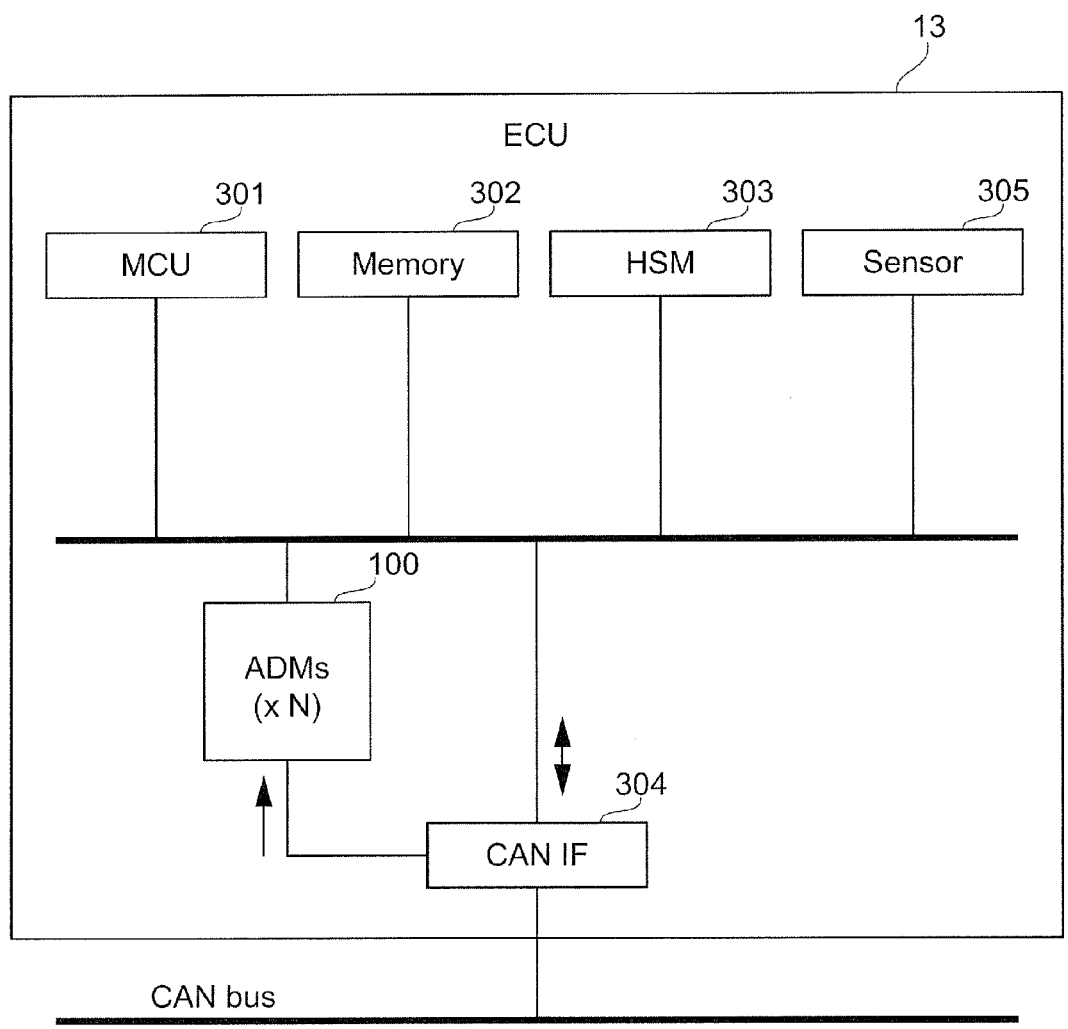
FIG. 6 is an example of a block diagram of an engine control unit ("ECU") including the ADM.

FIG. 6 is an example of a block diagram of an ECU 13 including the ADM 100. The ECU 13 includes the ADM 100, a MCU 301, a memory 302, a HSM 303, a CAN IF 304, and a sensor 305. The MCU 301, the memory 302, the HSM 303 and the CAN IF 304 have the same functions as the MCU 201, the memory 202, the HSM 203 and the CAN IF 204 in the first exemplary embodiment, respectively. Further, the MCU 301 controls behavior of the ECU 13, and acquires information of the monitoring result of the ADM 100. The MCU 301 temporarily monitors information of the warning counter 106 of the ADM 100. The sensor 305 detects the state of devices to which the ECU 13 is connected. The anomalies detected by the ADM 100 are sent to the communication unit 12 through the CAN bus and the detected anomalies are handled in the same manner as in the case of the first exemplary embodiment.

Figure 7:
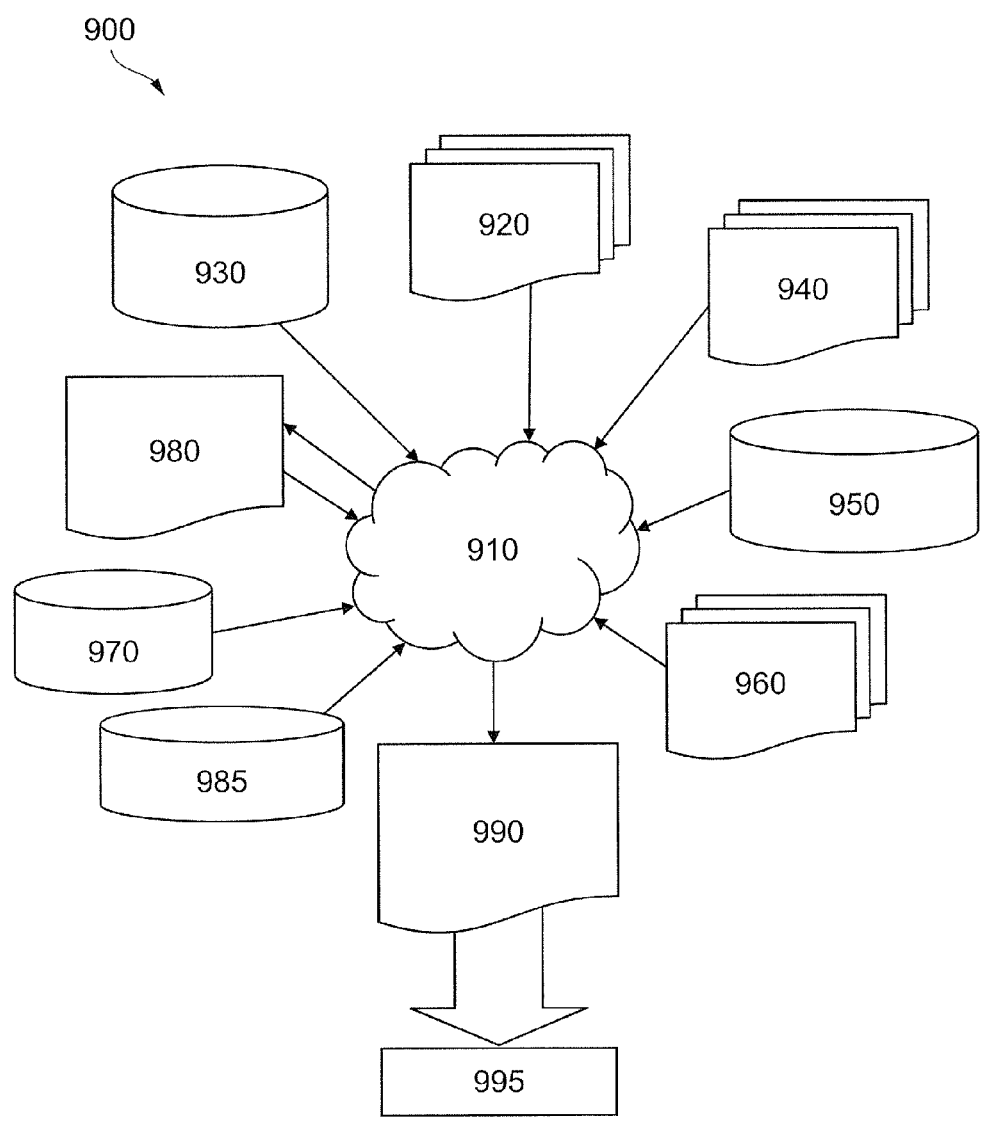
FIG. 7 is a flow diagram of a design process used in semiconductor design, manufacture, and/or test.

FIG. 7 shows a block diagram of an exemplary design flow 900 used, for example, in semiconductor IC logic design, simulation, test, layout, and manufacture. Design flow 900 includes processes, machines and/or mechanisms for processing design structures or devices to generate logically or otherwise functionally equivalent representations of the design structures and/or devices described above and shown in FIG. 3. The design structures processed and/or generated by design flow 900 may be encoded on machine-readable transmission or storage media to include data and/or instructions that when executed or otherwise processed on a data processing system generate a logically, structurally, mechanically, or otherwise functionally equivalent representation of hardware components, circuits, devices, or systems. Machines include, but are not limited to, any machine used in an IC design process, such as designing, manufacturing, or simulating a circuit, component, device, or system. For example, machines may include: lithography machines, machines and/or equipment for generating masks (e.g., e-beam writers), computers or equipment for simulating design structures, any apparatus used in the manufacturing or test process, or any machines for programming functionally equivalent representations of the design structures into any medium (e.g., a machine for programming a programmable gate array).

Design flow 900 may vary depending on the type of representation being designed. For example, a design flow 900 for building an application specific IC ("ASIC") may differ from a design flow 900 for designing a standard component or from a design flow 900 for instantiating the design into a programmable array, for example a programmable gate array ("PGA") or a field programmable gate array ("FPGA") offered by Altera® Inc. or Xilinx® Inc.

FIG. 7 illustrates multiple such design structures including an input design structure 920 that is preferably processed by a design process 910. Design structure 920 may be a logical simulation design structure generated and processed by design process 910 to produce a logically equivalent functional representation of a hardware device. Design structure 920 may also or alternatively comprise data and/or program instructions that, when processed by design process 910, generate a functional representation of the physical structure of a hardware device. Whether representing functional and/or structural design features, design structure 920 may be generated using electronic computer-aided design ("ECAD") such as implemented by a core developer/designer. When encoded on a machine-readable data transmission, gate array, or storage medium, design structure 920 may be accessed and processed by one or more hardware and/or software modules within design process 910 to simulate or otherwise functionally represent an electronic component, circuit, electronic or logic module, apparatus, device, or system such as those shown in FIG. 3. As such, design structure 920 may comprise files or other data structures including human and/or machine-readable source code, compiled structures, and computer-executable code structures that when processed by a design or simulation data processing system, functionally simulate or otherwise represent circuits or other levels of hardware logic design. Such data structures may include hardware-description language ("HDL") design entities or other data structures conforming to and/or compatible with lower-level HDL design languages such as Verilog and VHDL, and/or higher level design languages such as C or C++.

Design process 910 preferably employs and incorporates hardware and/or software modules for synthesizing, translating, or otherwise processing a design/simulation functional equivalent of the components, circuits, devices, or logic structures shown in FIG. 3 to generate a Netlist 980 which may contain design structures such as design structure 920. Netlist 980 may comprise, for example, compiled or otherwise processed data structures representing a list of wires, discrete components, logic gates, control circuits, I/O devices, models, etc. that describes the connections to other elements and circuits in an integrated circuit design. Netlist 980 may be synthesized using an iterative process in which netlist 980 is resynthesized one or more times depending on design specifications and parameters for the device. As with other design structure types described herein, netlist 980 may be recorded on a machine-readable data storage medium or programmed into a programmable gate array. The medium may be a non-volatile storage medium such as a magnetic or optical disk drive, a programmable gate array, a compact flash, or other flash memory. Additionally, or in the alternative, the medium may be a system or cache memory, buffer space, or electrically or optically conductive devices and materials on which data packets may be transmitted and intermediately stored via the Internet, or other networking suitable means.

Design process 910 may include hardware and software modules for processing a variety of input data structure types including Netlist 980. Such data structure types may reside, for example, within library elements 930 and include a set of commonly used elements, circuits, and devices, including models, layouts, and symbolic representations, for a given manufacturing technology (e.g., different technology nodes, 32 nm, 45 nm, 90 nm, etc.). The data structure types may further include design specifications 940, characterization data 950, verification data 960, design rules 970, and test data files 985 which may include input test patterns, output test results, and other testing information. Design process 910 may further include, for example, standard mechanical design processes such as stress analysis, thermal analysis, mechanical event simulation, process simulation for operations such as casting, molding, and die press forming, etc. One of ordinary skill in the art of mechanical design can appreciate the extent of possible mechanical design tools and applications used in design process 910 without deviating from the scope and spirit of the invention. Design process 910 may also include modules for performing standard circuit design processes such as timing analysis, verification, design rule checking, place and route operations, etc.

Design process 910 employs and incorporates logic and physical design tools such as HDL compilers and simulation model build tools to process design structure 920 together with some or all of the depicted supporting data structures along with any additional mechanical design or data (if applicable), to generate a second design structure 990. Design structure 990 resides on a storage medium or programmable gate array in a data format used for the exchange of data of mechanical devices and structures (e.g., information stored in a IGES, DXF, Parasolid XT, JT, DRG, or any other suitable format for storing or rendering such mechanical design structures). Similar to design structure 920, design structure 990 preferably comprises one or more files, data structures, or other computer-encoded data or instructions that reside on transmission or data storage media and that when processed by an ECAD system generate a logically or otherwise functionally equivalent form of one or more of the embodiments of the invention shown in FIG. 3. In one embodiment, design structure 990 may comprise a compiled, executable HDL simulation model that functionally simulates the devices shown in FIG. 3.

Design structure 990 may also employ a data format used for the exchange of layout data of integrated circuits and/or symbolic data format (e.g., information stored in a GDSII (GDS2), GL1, OASIS, map files, or any other suitable format for storing such design data structures). Design structure 990 may comprise information such as, for example, symbolic data, map files, test data files, design content files, manufacturing data, layout parameters, wires, levels of metal, vias, shapes, data for routing through the manufacturing line, and any other data required by a manufacturer or other designer/developer to produce a device or structure as described above and shown in FIG. 3. Design structure 990 may then proceed to a stage 995 where, for example, design structure 990: proceeds to tape-out, is released to manufacturing, is released to a mask house, is sent to another design house, is sent back to the customer, etc.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A monitoring device configured to monitor a network connected to a plurality of controllers, the monitoring device comprising:
   a decoder configured to extract target data belonging to a target data group from data received from the plurality of controllers;
   a first comparator configured to determine whether an immutable part of the target data is known or anomalous;
   a second comparator configured to determine whether a reception interval of the target data group is normal or anomalous;
   a third comparator configured to determine whether a number of the target data received and included in the target data group is normal or anomalous, and determine whether each reception interval between the target data is normal or anomalous;
   a warning counter configured to individually count a number of anomalies determined by the first comparator, a number of anomalies determined by the second comparator, and a number of anomalies determined by the third comparator;
   a first register configured to set identification information of the target data;
   a second register configured to set information of the immutable part of the target data;
   a third resister configured to set a normal value of the reception interval of the target data group;

a fourth register configured to set a normal value of each reception interval between the target data of the target data group;
a fifth register configured to set a normal value of the number of the target data of the target data group;
a first counter configured to count the reception interval of the target data group; and
a second counter configured to count each reception interval between the target data of the target data group, wherein:
the decoder is configured to extract the target data belonging to the target data group by comparing the data received from the plurality of controllers and a value of the identification information set in the first register;
the first comparator is configured to determine whether the immutable part of the target data is known or anomalous by comparing the immutable part of the target data and a value of the information set in the second register;
the second comparator is configured to determine whether the reception interval of the target data group is normal or anomalous by comparing a value counted by the first counter and the normal value set in the third register; and
the third comparator is configured to determine whether each reception interval between the target data is normal or anomalous by comparing a value counted by the second counter and the normal value set in the fourth register, and determine whether the number of the target data of the target data group is normal or anomalous on the basis of the normal value set in the fifth register.

2. The monitoring device of 1, wherein:
the monitoring device is installed in a gateway, wherein the gateway is connected to a plurality of network buses, the plurality of network buses connected to the plurality of controllers; and
the monitoring device is configured to monitor data received through a plurality of interfaces of the gateway for the plurality of network buses.

3. The monitoring device of claim 1, wherein the monitoring device is installed in each of the plurality of controllers, and the monitoring device is configured to monitor data output from the corresponding one of the plurality of controllers.

4. A semiconductor integrated circuit, comprising:
a decoder;
a plurality of comparators; and
a warning counter, wherein:
the decoder is configured to extract target data belonging to a target data group from data received from an outside;
a first comparator of the plurality of comparators is configured to determine whether an immutable part of the target data is known or anomalous;
a second comparator of the plurality of comparators is configured to determine whether a reception interval of the target data group is normal or anomalous;
a third comparator of the plurality of comparators is configured to determine whether a number of the target data having been received and included in the target data group is normal or anomalous and each reception interval between the target data is normal or anomalous; and
the warning counter is configured to individually count a number of anomalies determined by the first comparator, a number of anomalies determined by the second comparator, and a number of anomalies determined by the third comparator;
a first register configured to set identification information of the target data;
a second register configured to set information immutable part of the target data;
a third register configured to set a normal value of the reception interval of the target data group;
a fourth register configured to set a normal value of each reception interval between the target data of the target data group;
a fifth register configured to set a normal value of the number of the target data of the target data group;
a first counter configured to count the reception interval of the target data group; and
a second counter configured to count each reception interval between the target data of the target data group, wherein:
the decoder is configured to extract the target data belonging to the target data group by comparing the data received from the outside and a value of the identification information set in the first register;
the first comparator is configured to determine whether the immutable part of the target data is known or anomalous by comparing the immutable part of the target data and a value of the information set in the second register;
the second comparator is configured to determine whether the reception interval of the target data group is normal or anomalous by comparing a value counted by the first counter and the normal value set in the third register; and
the third comparator is configured to determine whether each reception interval between the target data is normal or anomalous by comparing a value counted by the second counter and the normal value set in the fourth register, and determine whether the number of the target data of the target data group is normal or anomalous on the basis of the normal value set in the fifth register.

5. A network device, comprising:
a plurality of controllers; and
a monitoring device configured to monitor data output from each of the plurality of controllers, wherein the monitoring device comprises:
a decoder configured to extract target data belonging to a target data group from data received from the plurality of controllers;
a first comparator configured to determine whether an immutable part of the target data is known or anomalous;
a second comparator configured to determine whether a reception interval of the target data group is normal or anomalous;
a third comparator configured to determine whether a number of the target data having been received and included in the target data group is normal or anomalous, and each reception interval between the target data is normal or anomalous;
a warning counter configured to individually count a number of anomalies determined by the first comparator, a number of anomalies determined by the second comparator, and a number of anomalies determined by the third comparator;

a first register configured to set identification information of the target data;

a second register configured to set information of the immutable part of the target data;

a third register configured to set a normal value of the reception interval of the target data group;

a fourth register configured to set a normal value of each reception interval between the target data of the target data group;

a fifth register configured to set a normal value of the number of the target data of the target data group;

a first counter configured to count the reception interval of the target data group; and a second counter configured to count each reception interval between the target data of the target data group, wherein:

the decoder is configured to extract the target data belonging to the target data group by comparing the data received from the plurality of controllers and a value of the identification information set in the first register;

the first comparator is configured to determine whether the immutable part of the target data is known or anomalous by comparing the immutable part of the target data and a value of the information set in the second register;

the second comparator is configured to determine whether the reception interval of the target data group is normal or anomalous by comparing a value counted by the first counter and the normal value set in the third register; and the third comparator is configured to determine whether each reception interval between the target data is normal or anomalous by comparing a value counted by the second counter and the normal value set in the fourth register, and determine whether the number of the target data of the target data group is normal or anomalous on the basis of the normal value set in the fifth register.

6. The network device of claim 5, further comprising:
a plurality of network buses connected to the plurality of controllers; and
a gateway connected to the plurality of network buses, wherein the monitoring device is installed in the gateway, and the monitoring device is configured to monitor data output from the plurality of controllers and received through interfaces of the gateway for the plurality of network buses.

7. The network device of claim 5, wherein the monitoring device is installed in each of the plurality of controllers, and the monitoring device is configured to monitor data output from the corresponding one of the plurality of controllers.

8. The network device of claim 5, further comprising a communication device connected to an external network and configured to send information of a monitoring result of the monitoring device to a server on the external network.

* * * * *